United States Patent [19]

Lutz

[11] 4,009,774

[45] Mar. 1, 1977

[54] CONVEYOR

[76] Inventor: David E. Lutz, 330 Washington Lane, Carlisle, Pa. 17013

[22] Filed: Oct. 29, 1974

[21] Appl. No.: 519,179

Related U.S. Application Data

[63] Continuation of Ser. No. 304,432, Nov. 7, 1972, abandoned.

[52] U.S. Cl. .............................. 198/773; 214/83.3
[51] Int. Cl.² ......................................... B65G 25/04
[58] Field of Search .......... 214/83.3, 505; 198/219, 198/160

[56] References Cited

UNITED STATES PATENTS

| | | | |
|---|---|---|---|
| 2,973,856 | 3/1961 | Brooks | 198/219 |
| 3,075,635 | 1/1963 | Ruppe | 198/219 |
| 3,415,400 | 12/1968 | Olin | 214/505 |
| 3,620,353 | 11/1971 | Foster et al. | 198/160 |
| 3,749,550 | 7/1973 | Saydan | 198/219 |
| 3,767,067 | 10/1973 | Mickey et al. | 214/83.3 |
| 3,792,965 | 2/1974 | Bergtsson | 198/219 |
| 3,871,534 | 4/1975 | Burse | 198/219 |

Primary Examiner—

[57] ABSTRACT

A conveyor primarily useful for handling palletized loads comprising in combination a walking beam conveyor and a non-powered roller conveyor. The palletized load is normally supported on a static support and the roller conveyor, but when it is desired to shift the load longitudinally, the walking beam conveyor lifts the load only a distance sufficient to lift a portion of the load resting on the static support by taking advantage of the inherent flexibility in the pallet while the pallet still rests on the roller conveyor. The walking beam conveyor then shifts the load longitudinally along the roller conveyor.

1 Claim, No Drawings

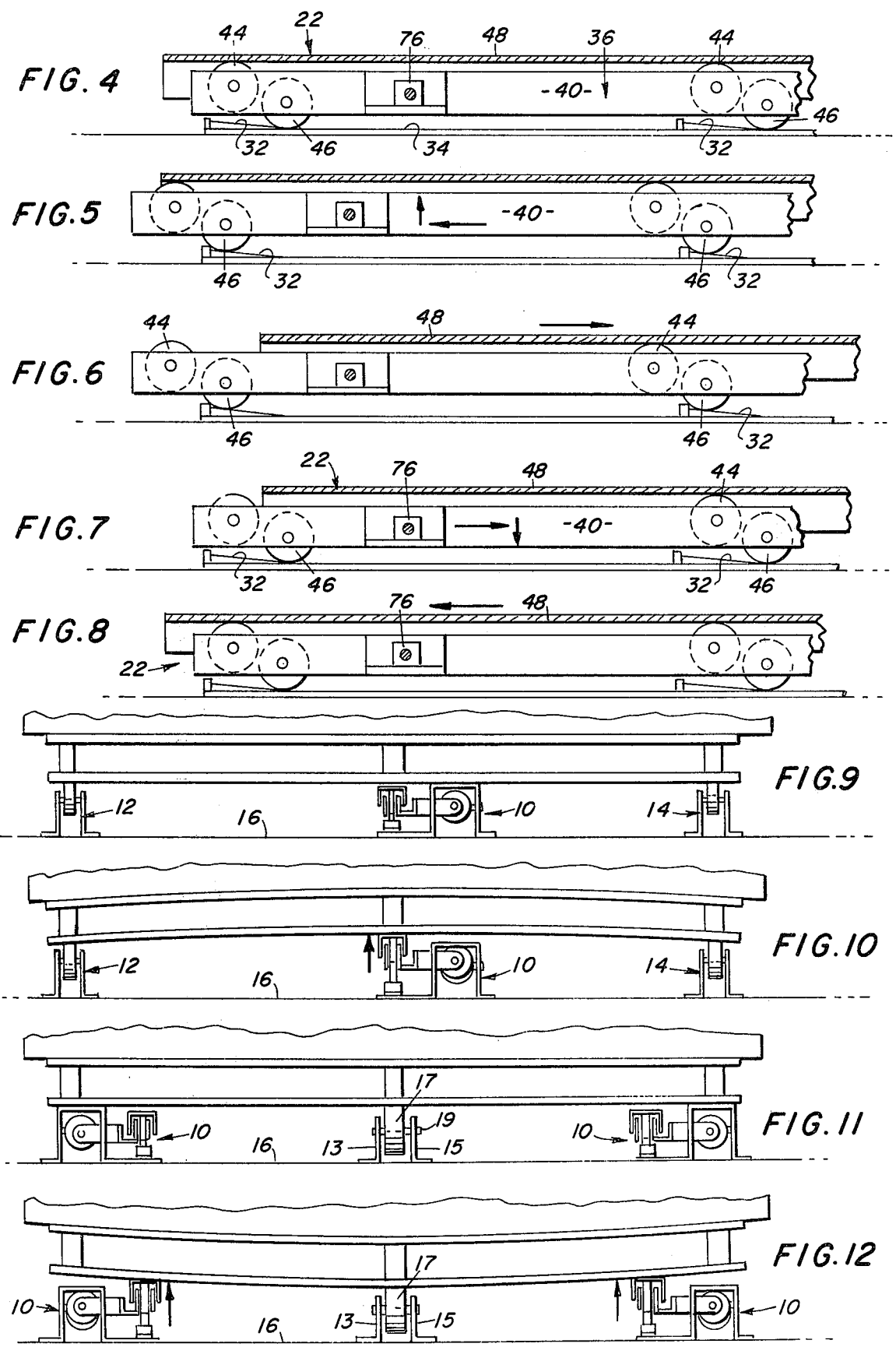

CONVEYOR

This is a continuation application of Ser. No. 304,432, filed Nov. 7, 1972, now abandoned.

This invention relates to a conveyor and more particularly to a conveyor for transporting loads placed on pallets or the like. The most common way to ship packages and articles is to stack them on a pallet which in turn can be readily handled by a forklift truck. These palletized loads can be easily placed on and removed from vehicles such as railroad cars, trucks, airplanes or the like. The conveyor of this invention is particularly useful with palletized loads and more particularly toward those that employ pallets having some degree of flexibility. Wooden pallets, perhaps the most commonly used type, fall within this category. In fact, most pallets have some degree of flexure sufficient for the purposes of this invention. The degree of flexure need only be slight as will be pointed out below.

The conveyor of this invention is in general useful for transporting loads over any planar surface such as docks, warehouse floors or the like and is particularly useful in vehicles and may be readily fitted to existing truck bodies. Roller conveyors are well known in the prior art as are walking beam conveyors. The conveyor of this invention is a combination of a walking beam conveyor and a roller conveyor.

It is an objective of this invention to provide a relatively inexpensive and lightweight conveyor for palletized loads.

It is a further objective of this invention to provide a conveyor which requires less horsepower than those of prior art to move a load through a longitudinal path.

It is a further objective of this invention to provide a conveyor which can be readily installed in vehicles without modification to the existing structure.

Generally, the objectives of this invention are accomplished by affixing a longitudinally extending single movable beam, walking beam conveyor to a suitable base such as warehouse floor, dock or vehicle floor. A pair of roller conveyor strings are affixed to the base in spaced relationship to and on either side of the walking beam conveyor. The walking beam conveyor is generally centrally disposed and parallel to the roller conveyor strings. The walking beam conveyor comprises a static load support in the form of a longitudinally extending beam and a movable beam which, during operation, moves vertically from a first position wherein its upper surface is below that of said static support to a second position wherein its upper surface is above that of said static support. The upper surfaces of the rollers of the roller conveyor and the upper surface of the static support beam lie in substantially the same horizontal plane and normally provide three-point support for a palletized load with the frictional engagement between the static support beam and the underside of the pallet preventing movement of the pallet over the rollers. The movable beam is provided with lifting means for first lifting the movable beam to the second position to lift the pallet out of engagement with the static support beam. Due to the inherent flexure of conventional pallets, such as those of wood or the like, and due to the close proximity of the movable beam to the static support beam, only that portion just above the static support beam will be lifted while the outer portions of the pallet will continue to rest on the rollers. The vertical distance traveled need only be about ½ in. Longitudinal drive means are then actuated to shift the movable beam longitudinally, and because of its frictional engagement with the under side of the pallet, the pallet is caused to move along the rollers. At the end of its movement path, the movable beam is lowered and the pallet is again allowed to rest on the static support beam and is thereby prevented from movement over the rollers. The movable beam is retracted in its lowered position and the cycle is repeated.

In a modified form of the invention, two walking beam conveyors are employed with a single roller conveyor string, the latter being disposed centrally of the walking beam conveyors. In this case, when the walking beam conveyor is raised, the outer ends of the pallet are flexed upwardly, while the central portion remains in contact with the rollers.

These and other objects of the invention will become more apparent to those skilled in the art by reference to the following detailed description when viewed in light of the accompanying drawings wherein:

FIGS. 4 through 8 depict the cycle of operation for the walking beam conveyor with the views therein taken generally along lines 4—4 of FIG. 2;

FIG. 9 is an end view showing a pallet in place on the conveyor of this invention;

FIG. 10 is similar to FIG. 9 except that the walking beam conveyor is in the raised position and the pallet is flexed off of the static supporting beam;

FIG. 11 is an end view of the modified form of another embodiment of the conveyor of this invention employing two walking beam conveyors and a single roller conveyor string; and FIG. 12 is similar to FIG. 11 with the walking beam conveyor in the raised position to flex the outer ends of the pallet off of the static support beams.

Referring now to the figures where in like numerals indicate like parts, the conveyor of this invention, with particular reference to FIGS. 9 and 10, includes a walking beam conveyor 10 and laterally spaced, single-string roller conveyors 12 and 14. Each of these elements is affixed to a suitable supporting base 16 such as a warehouse floor, dock, vehicle bed or the like. As mentioned earlier herein, the conveyor of this invention is particularly useful for transporting palletized loads such as that indicated by the numeral 18.

Figure 1:
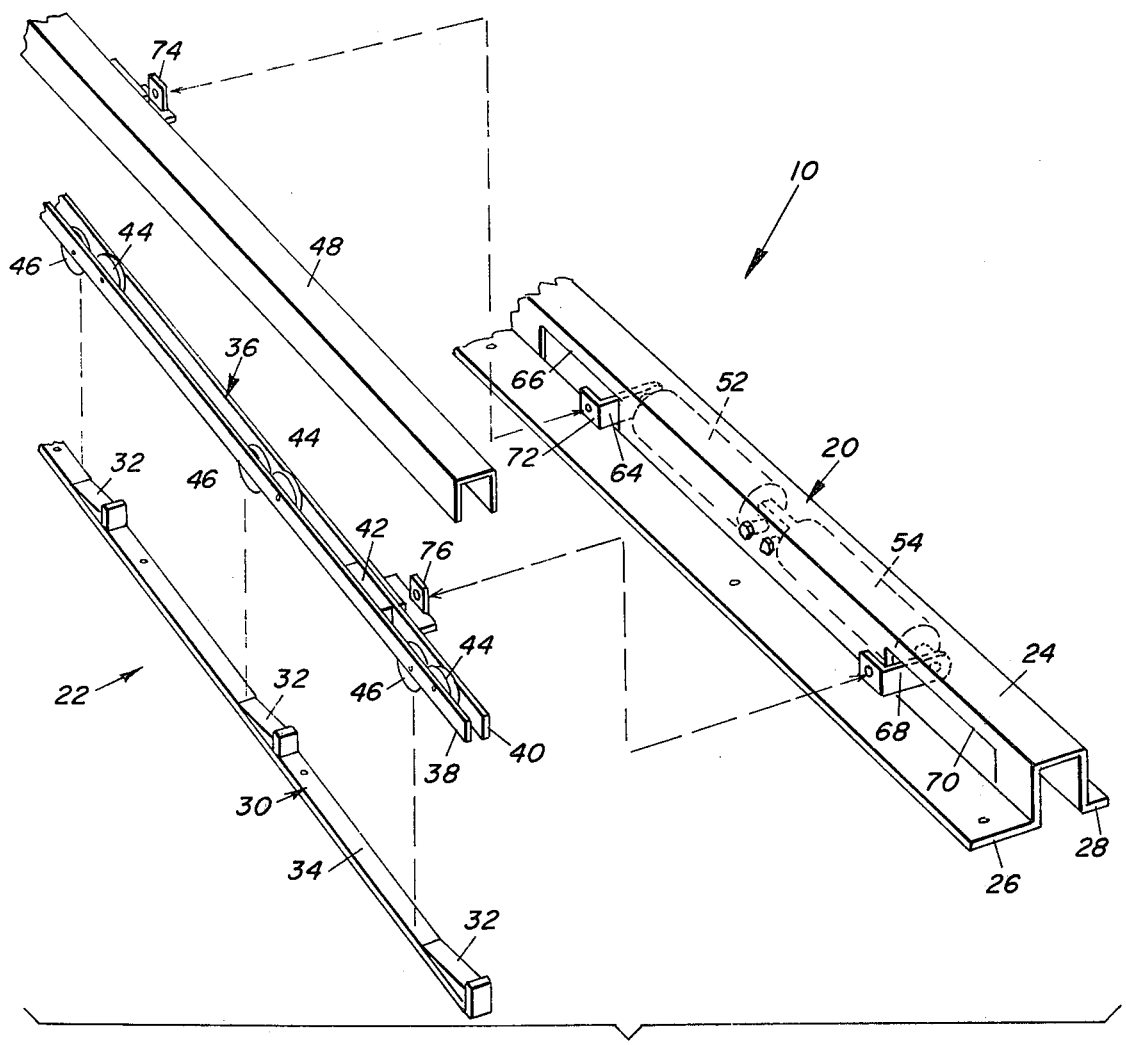
FIG. 1 is an exploded view in perspective showing the walking beam conveyor in disassembled condition.
Figure 2:
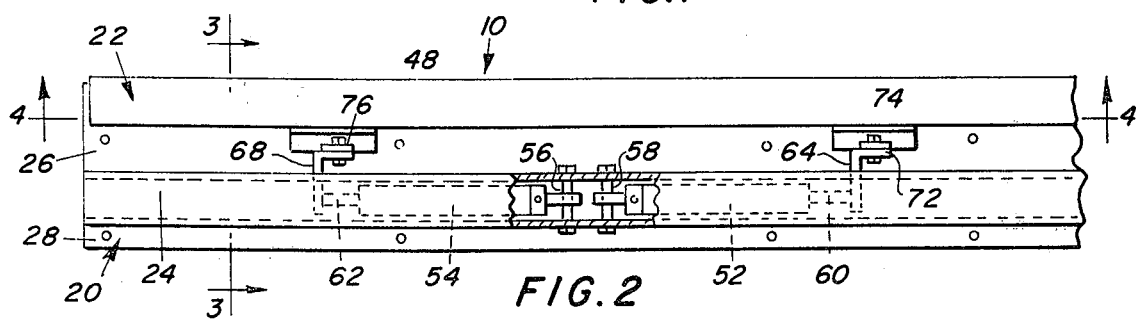
FIG. 2 is a plan view of the walking beam conveyor, of this invention.
Figure 3:
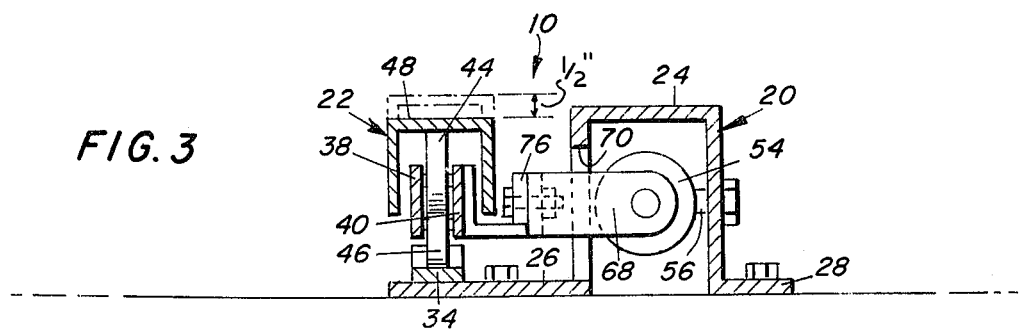
FIG. 3 is a cross sectional view taken along lines 3—3 of FIG. 2.

The walking beam conveyor 10 can best be described with reference to FIGS. 1 through 3. Basically the walking beam conveyor comprises a static support means 20 and a movable beam 22. The static support means comprises an elongated beam 24, which in cross section is in the form of an inverted "U" and has flanges 26, 28 extending from the ends of the free legs thereof. Suitable fasteners are inserted through apertures in the flanges 26 and 28 to secure the beam 24 to the supporting base. The movable beam assembly 22 comprises a ramp member 30 including a plurality of longitudinally spaced ramps 32 on a supporting strip 34. In a preferred embodiment, the strip 34 is fastened to the flange 26 by the same fasteners used to secure the beam 24 to the supporting base. Overlying the ramp 30 is an intermediate member 36 comprising spaced parallel side beams 38 and 40 which are joined together and maintained in spaced relationship by means of spacer blocks 42. Two sets of rollers, upper rollers 44 and lower rollers 46 are journaled on axles extending between the side beams 38 and 40. The peripheries of the lower rollers 46 extend below the lower edges of the beams 38 and 40 while the peripheries of the upper rollers 44 extend above the upper edges of the beams. The lower rollers 46 ride on strip 34 and up ramps 32 and are spaced along the length of the intermediate member 36 at points corresponding generally to the position of the ramps on the strip 34. The movable beam 48, of inverted U-shaped cross section, is fitted over the intermediate member 36 and the under surface of the bight portion of the beam 48 rides on the rollers 44. The intermediate member 36 and the movable beam 48 are shiftable relative to each other in a linear direction.

The intermediate member 36 may be referred to as the lifting means for lifting beam 48 from a lowered position wherein its upper surface is below the upper surface of the static support beam 24 to a raised position wherein its upper surface is above that of the beam 24. In the preferred embodiment, the distance of vertical movement is approximately ½ in. Accordingly, the height of the ramp 32 is ½ in. The assembly as shown in FIG. 4 is in the lowered position while in FIG. 5 the assembly is in the raised position with the intermediate member and rollers 46 supported on ramps 32.

Drive means comprising hydraulic cylinders 52 and 54 are housed in the hollow confines of the static supporting beam 24. As best seen in FIG. 2, cylinder 54 is pivotally attached at one end to transversely extending pin 56 while cylinder 52 is pivotally attached at one end thereof to transversely extending pin 58. Pistons are reciprocably received in cylinders 52 and 54 and include piston rods 60 and 62 respectively. An L-shaped bracket 64 is attached to the outer end of piston rod 60 with the short leg portion thereof extending through an elongated slot 66 in the side wall of the beam 24 adjacent to the movable beam assembly 22. Likewise, an L-shaped member 68 is attached to the outer end of piston rod 62 and extends through an elongated slot 70. The short leg 72 of bracket 64 is attached to a bracket 74 which in turn is affixed to the movable beam 48. Bracket 68 is attached to bracket 76 which in turn is affixed to the intermediate member 36. The bracket 76 is appropriately offset from the intermediate beam 36 to permit placement of the movable beam 48 over the intermediate beam without interference.

The operation of the walking beam conveyor portion of this invention will now be described with reference to FIGS. 4 through 8. In FIG. 4, walking beam conveyor is shown in the start position wherein each of the cylinders 52 and 54 are retracted. The upper surface of the movable beam 48 lies below the upper surface of the static support beam 24. To initiate operation, the cylinder 54 is extended to move the intermediate member 36 to the left as shown in FIGS. 4 and 5 whereupon the rollers 46 move up onto ramps 32 to raise the intermediate member 36 and the movable beam supported thereon to a position where the upper surface of the movable beam lies above the upper surface of the static support beam. The stroke length of the piston 54 corresponds generally to the length of the ramp 32. In this position, a load that was originally supported on the static support beam will now be supported by the movable beam. In order to shift the load forward relative to the supporting base, the cylinder 52 is actuated to reciprocate movable beam 48 to the right as viewed in FIGS. 6 and 7 on rollers 44. At the end of the stroke length of the piston which in a preferred embodiment is approximately 36 in., the cylinder 54 is retracted to the position shown in FIG. 7 wherein the upper surface of the movable beam 48 lies below the upper surface of the static support beam 24. The load is now resting on the beam 24. The cylinder 52 is then retracted to move the movable beam back to the original starting position as shown in FIG. 8. The cycle is then repeated.

The single-string roller conveyors used in this invention are conventional and, with reference to FIG. 9, each includes upright supporting brackets 13 and 15 having a series of tandemly arranged rollers only one of which can be seen in the Figure. Rollers 17 are journaled on axles 19 extending between the uprights 13 and 15.

As mentioned earlier herein, this invention is designed for use with palletized loads wherein the pallets include some inherent resiliency permitting them to be deflected off of a portion of its three-point support between the roller conveyors and the walking beam assembly. FIG. 10 is an exaggerated representation of the deflection of the pallet. The upper peripheries of the rollers 17 of the roller conveyors 12 and 14 lie in substantially the same horizontal plane as the upper surface of the beam 24 of the static support beam 24. In this position, the palletized load 18 is held from movement by means of its frictional engagement with the beam 24. This is particularly desirable for example where the conveyor is mounted in a vehicle and the load is subjected to vehicle inertial forces. When it is desired to transport the load along the length of the conveyor such as in loading or unloading the vehicle, the cycle of operation of the walking beam conveyors is commenced in the manner heretofore explained with the movable beam being shifted to the raised position as shown in FIG. 10. As mentioned earlier the movable beam 48 moves only a total vertical distance of ½ in. to a point wherein its upper surface lies just ¼ in. above the upper surface of the fixed beam 24. Most pallets, due to their inherent resiliency, will deflect just enough to raise off of the fixed beam while its outer edge portions maintain contact with the outrigger roller strings 12 and 14. Hence when cylinder 52 is extended to reciprocate movable beam 48, the pallet will be moved over the roller conveyors 12 and 14. Most of the weight will be supported by the roller conveyors and the amount of force required to move the palletized load will be greatly diminished in comparison with those conveyors known to the prior art.

A modified form of the conveyor of this invention is shown in FIG. 11 wherein only a single roller conveyor is used while two outrigger walking beam assemblies are used. The operation is substantially the same as that for FIGS. 9 and 10 except that instead of the middle of the palletized load being deflected upwardly and the outer ends thereof resting on the roller conveyors, the outer ends of the palletized load are deflected upwardly while the central portion rests on the single roller conveyor.

It is to be understood that the elements herein may be modified by one skilled in the art while remaining within the realm of this invention. For example, means other than the intermediate member and ramp assembly of the walking beam conveyor may be used to raise the movable beam from its lower position to its upper position. The use of cranks, eccentric cams, and inflatable devices are well known in the art for accomplishing the lifting function in walking beam conveyors. Likewise, means other than hydraulic cylinders may be employed to effect the longitudinal shifting movement. Further, the conveyor is not only to be used with pallets it being understood that certain containers in themselves may possess sufficient resiliency in the base portion thereof to permit the deflection required for operation of the conveyor of this invention.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. A conveyor for shifting a load comprising a base, load support means mounted on said base, said load support means including longitudinally extending static support means for supporting and restraining said load, said static support comprising a longitudinally extending beam mounted on said base, longitudinally extending roller support means laterally spaced from said static support means and generally parallel thereto, said roller support means comprising a pair of longitudinally extending roller conveyors, one on each side of said beam, the upper surface of said roller means and said static support means lying in substantially the same horizontal plane and normally supporting said load, a walking beam conveyor between said static support means and said roller means and closely adjacent said static support means, said walking beam conveyor being movable vertically from a position wherein its upper surface is below the upper surface of said static support means to a position wherein its upper surface is slightly above said upper surface of said static support means, said load being relatively rigid and having a limited degree of flexibility to permit said load to be deflected relative to a horizontal plane, means for actuating said walking beam conveyor to partially lift said load whereby the load is lifted from said static support means but not from said roller support means, said longitudinal drive means for shifting said walking beam conveyor longitudinally of said base whereby said load is moved over said roller means.

2. In combination, a conveyor, a generally rigid load to be shifted by said conveyor being capable of limited deflection relative to a horizontal plane, said conveyor comprising a base, load support means mounted on said base, said load support means including longitudinally extending static support means for supporting and restraining said load, said static support means comprising a longitudinally extending beam mounted on said base, longitudinally extending roller support means laterally spaced from said static support means and generally parallel thereto, said roller support means comprising a pair of longitudinally extending roller conveyors, one on each side of said beam, the upper surface of said roller means and said static support means lying in substantially the same horizontal plane and normally supporting said load, a walking beam conveyor, between said static support means and said roller means and closely adjacent said static support means, said walking beam conveyor being movable vertically from a position wherein its upper surface is below the upper surface of said static support means to a position wherein its upper surface is slightly above said upper surface of said static support means, means for actuating said walking beam conveyor to partially lift said load whereby the load is lifted from said static support means but not from said roller support means, and longitudinal drive means for shifting said walking beam conveyor longitudinally of said base whereby said load is moved over said roller means.

3. A conveyor for shifting a load comprising a base, load-support means mounted on said base, said load-support means including longitudinally extending static support means for supporting and restraining said load, said static support comprising a pair of longitudinally extending beams mounted on said base, a longitudinally extending roller support means generally parallel to said pair of beams and disposed between said beams and substantially equispaced therefrom, the upper surface of said roller means and said beams lying in substantially the same horizontal plane and normally supporting said load, a pair of walking beam conveyors, one of said pair of walking beam conveyors disposed adjacent to one of said beams and the other walking beam conveyor being disposed adjacent the other beam, said walking beam conveyors being movable vertically from a position wherein their upper surfaces are below the upper surfaces of said beams to a position wherein their upper surfaces are slightly above said upper surfaces of said beams, said load being relatively rigid and having a limited degree of flexibility to permit said load to be deflected relative to a horizontal plane, means for actuating said walking beam conveyors to partially lift said load whereby the load is lifted from said beams but not from said roller support means, and longitudinal drive means for shifting said walking beam conveyors longitudinally of said base whereby said load is moved over said roller means.

4. In combination, a conveyor, a generally rigid load to be shifted by said conveyor being capable of limited deflection relative to a horizontal plane, said conveyor comprising a base, load support means mounted on said base, said load support means including longitudinally extending static support means for supporting and restraining said load, said static support comprising a pair of longitudinally extending beams mounted on said base, a longitudinally extending roller support means generally parallel to said pair of beams and disposed between said beams and substantially equispaced therefrom, the upper surface of said roller means and said beams lying in substantially the same horizontal plane and normally supporting said load, a pair of walking beam conveyors, one of said pair of walking beam conveyors disposed adjacent to one of said beams and the other walking beam conveyor being disposed adjacent the other beam, said walking beam conveyors being movable vertically from a position wherein their upper surfaces are below the upper surfaces of said beams to a position wherein their upper surfaces are slightly above said upper surfaces of said beams, said load being relatively rigid and having a limited degree of flexibility to permit said load to be deflected relative to a horizontal plane, means for actuating said walking beam conveyors to partially lift said load whereby the load is lifted from said beams but not from said roller support means, and longitudinal drive means for shifting said walking beam conveyors longitudinally of said beam whereby said load is moved over said roller means.

* * * * *